United States Patent
Chao et al.

(10) Patent No.: US 11,334,427 B2
(45) Date of Patent: *May 17, 2022

(54) SYSTEM AND METHOD TO REDUCE ADDRESS RANGE SCRUB EXECUTION TIME IN NON-VOLATILE DUAL INLINE MEMORY MODULES

(71) Applicant: DELL PRODUCTS, L.P., Round Rock, TX (US)

(72) Inventors: Ching-Lung Chao, Austin, TX (US); Shih-Hao Wang, New Taipei (TW); Hsin-Chieh Wang, Taoyuan (TW)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/162,807

(22) Filed: Jan. 29, 2021

(65) Prior Publication Data

US 2021/0149761 A1 May 20, 2021

Related U.S. Application Data

(63) Continuation of application No. 16/426,372, filed on May 30, 2019, now Pat. No. 10,936,407.

(51) Int. Cl.
*G06F 11/10* (2006.01)
*G06F 12/02* (2006.01)

(52) U.S. Cl.
CPC ...... *G06F 11/1016* (2013.01); *G06F 12/0246* (2013.01)

(58) Field of Classification Search
CPC .................................................. G06F 11/1016
USPC ................................ 714/768, 769, 763, 765
See application file for complete search history.

(56) References Cited

U.S. PATENT DOCUMENTS

| | | | |
|---|---|---|---|
| 6,775,794 B1* | 8/2004 | Horst | G06F 11/1092 711/114 |
| 7,945,815 B2 | 5/2011 | Khatri et al. | |
| 8,452,912 B2* | 5/2013 | Lee | G06F 12/0246 711/103 |
| 9,348,604 B2 | 5/2016 | Munger et al. | |
| 9,524,390 B2 | 12/2016 | Kulkarni et al. | |
| 9,785,365 B1 | 10/2017 | Shallal et al. | |
| 10,147,712 B1 | 12/2018 | Lendvay | |
| 10,199,860 B2 | 2/2019 | Harris et al. | |
| 10,241,727 B1 | 3/2019 | Shallal | |
| 2002/0042892 A1* | 4/2002 | Gold | G06F 11/1417 714/6.11 |
| 2008/0163360 A1* | 7/2008 | Nishida | G06F 21/575 726/17 |
| 2008/0177994 A1* | 7/2008 | Mayer | G06F 9/4418 713/2 |

(Continued)

*Primary Examiner* — Guy J Lamarre
(74) *Attorney, Agent, or Firm* — Larson Newman, LLP (57) ABSTRACT

A non-volatile dual in-line memory module (NVDIMM) instantiates first and second partitions of non-volatile memory. The first partition is reserved and is not accessible to an operating system instantiated. The second partition is accessible to the operating system. A processor detects a first bad memory location in the second partition, stores a first system physical address of the first bad memory location to a system bad memory locations list, and stores a first DIMM physical address of the first bad memory location to a first NVDIMM bad memory locations list in the first partition.

20 Claims, 6 Drawing Sheets

(56) References Cited

U.S. PATENT DOCUMENTS

| | | |
|---|---|---|
| 2014/0281474 A1 | 9/2014 | Shutt et al. |
| 2015/0180920 A1 | 6/2015 | Hunter |
| 2015/0309165 A1 | 10/2015 | Elwart et al. |
| 2016/0246668 A1 | 8/2016 | Wang, III |
| 2017/0109058 A1 | 4/2017 | Shallal et al. |
| 2017/0329612 A1 | 11/2017 | Ragupath et al. |
| 2019/0026202 A1 | 1/2019 | Chalfant et al. |
| 2019/0026239 A1 | 1/2019 | Chalfant et al. |
| 2019/0163557 A1* | 5/2019 | Nguyen ............... G11C 29/883 |

* cited by examiner

SYSTEM AND METHOD TO REDUCE ADDRESS RANGE SCRUB EXECUTION TIME IN NON-VOLATILE DUAL INLINE MEMORY MODULES

CROSS-REFERENCE TO RELATED APPLICATION

This application is a continuation of U.S. patent application Ser. No. 16/426,372 entitled "System and Method to Reduce Address Range Scrub Execution Time in Non-volatile Dual Inline Memory Modules," filed on May 30, 2019, the disclosure of which is hereby expressly incorporated by reference in its entirety.

FIELD OF THE DISCLOSURE

The present disclosure generally relates to information handling systems, and more particularly relates to reducing address range scrub execution time in non-volatile dual inline memory modules.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a non-volatile dual in-line memory module (NVDIMM) that instantiates first and second partitions of non-volatile memory. The first partition may be reserved and may not be accessible to an operating system instantiated on the information handling system. The second partition may be accessible to the operating system. A processor may detect a first bad memory location in the second partition, store a first system physical address of the first bad memory location to a system bad memory locations list, and store a first DIMM physical address of the first bad memory location to a first NVDIMM bad memory locations list in the first partition.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
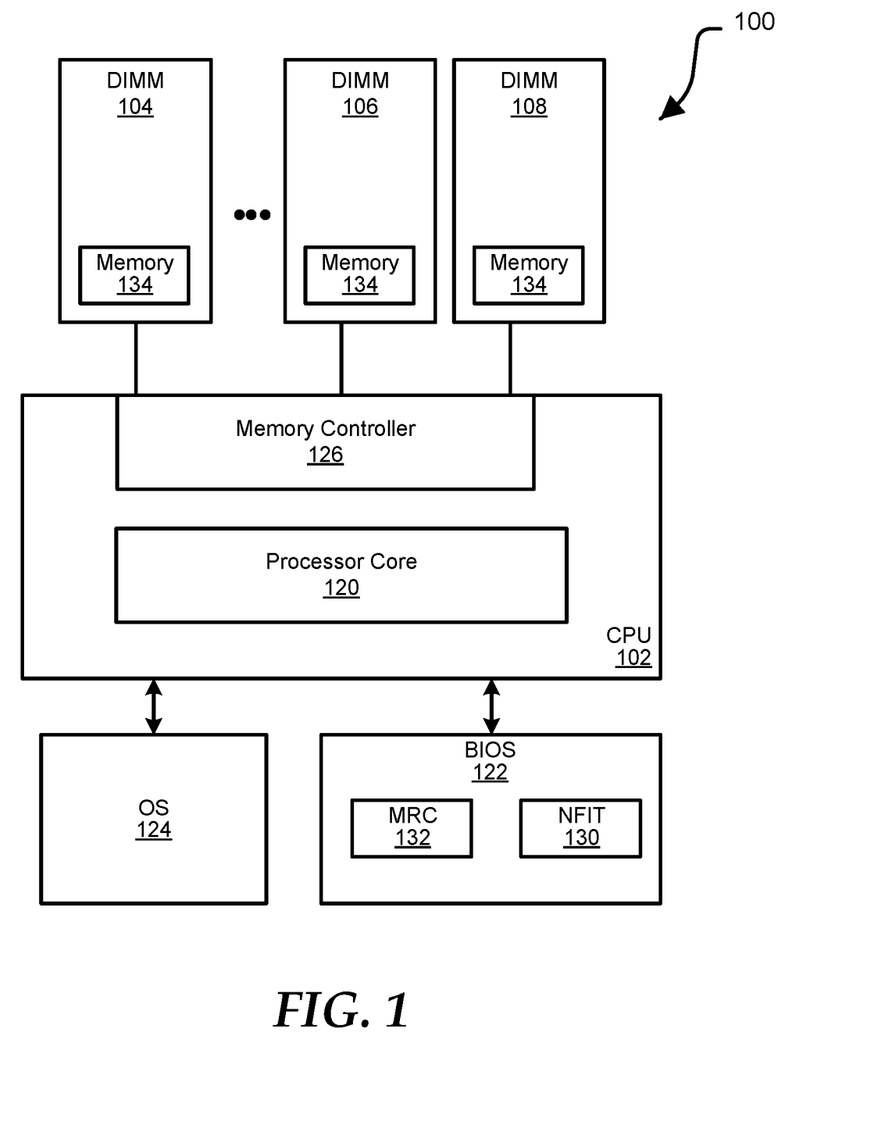
FIG. 1 is a block diagram of a portion of an information handling system according to at least one embodiment of the disclosure.

FIG. 1 shows a portion of an information handling system 100, including a CPU 102, and dual in-line memory modules (DIMMs) 104, 106, and 108. CPU 102 includes a processor core 120 and a memory controller 126. CPU 102 executes code to implement a basic input/output system (BIOS) 122, and upon completion of a boot process of the BIOS, executes an operating system (OS) 124. BIOS 122 represents firmware code utilized during the boot process to execute a power-on self-test (POST), to initialize the hardware components of information handling system 100, and to pass execution to OS 124. For example, the hardware components of information handling system 100 initialized by BIOS 122 may include, but are not limited to, CPU 102 and DIMMs 104, 106, and 108. BIOS 122 also represents firmware code to provide runtime services for OS 124 and other programs executed by CPU 102. BIOS 122 includes a non-volatile dual in-line memory module (NVDIMM) firmware interface table (NFIT) 130, and memory reference code (MRC) 132. NFIT 130 stores information including, but not limited to, persistent memory ranges and properties for DIMMs 104, 106, and 108.

DIMMS 104, 106, and 108 represent DIMMs that make one or more types of memory 134 accessible to CPU 102 for data storage. For example, DIMMs 104, 106, and 108 may include dynamic random access memory (DRAM), flash memory storage, NVDIMM storage, or other types of storage, as needed or desired. When one or more of DIMMs 104, 106, or 108 represents NVDIMM storage, the NVDIMM storage may include: NVDIMM-F having only persistent memory, such as flash storage; NVDIMM-N having both flash storage and DRAM on the same memory module; NVDIMM-P having persistent DRAM; and NVDIMM-X having NAND flash storage and DRAM on the same memory module. In a particular embodiment, one or more of DIMMs 104, 106, and 108 represent NVDIMMs that utilize Intel Optane DC Persistent Memory Modules (Apache Pass (AEP)) DIMMs with memory 134 configured according to one of the memory types stated above, such as NVDIMM-F. One of ordinary skill in the art will recognize that while FIG. 1 illustrates DIMMs 104, 106, and 108, this disclosure is not limited to three DIMMs but can be applied to any number of DIMMs, as indicated by the ellipses in between DIMMs 104 and 106. In an embodiment, one or more of DIMMs 104, 106, and 108 may include additional components (not shown), without varying from the scope of this disclosure.

CPU 102 provides the data processing functionality of information handling system 100, such as is typically associated with an information handling system. As such, CPU 102 represents a data processing apparatus, such as one or more processor cores, and the associated data input and output (I/O) functionality, such as a chipset component, and other I/O processor components. CPU 102 operates to execute machine-executable code to perform the data processing tasks associated with information handling system 100.

BIOS 122 can be referred to as a firmware image, and the term BIOS is herein used interchangeably with the term firmware image, or simply firmware. BIOS 122 includes instructions executable by CPU 102 to initialize and test the hardware components of system 100, and to load a boot loader or OS 124 from a mass storage device. BIOS 122 additionally provides an abstraction layer for the hardware, i.e. a consistent way for application programs and operating systems to interact with the keyboard, display, and other input/output devices. When power is first applied to information handling system 100, the information handling system begins a sequence of initialization procedures. During the initialization sequence, also referred to as a boot sequence, components of information handling system 100 are configured and enabled for operation, and device drivers for the components is installed. Device drivers provide an interface through which other components of information handling system 100 communicate with a corresponding device.

In a particular embodiment, BIOS 122 is substantially compliant with one or more revisions of the Unified Extensible Firmware Interface (UEFI) specification. The UEFI specification standard replaces the antiquated personal computer BIOS system found in some older information handling systems. The UEFI specification provides standard interfaces and interoperability guidelines for devices and components that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of information handling system 100. While the techniques disclosed herein are described in the context of a UEFI compliant system, one of skill will appreciate that the disclosed systems and methods can be implemented at substantially any information handling system having configurable firmware.

Memory controller 126 represents a portion of a processor complex that is dedicated to the management of the data storage and retrieval from the memory devices of information handling system 100, and the information handling system 100 may include one or more additional memory controllers similar to the memory controller 126, as needed or desired. Memory controller 126 may reside on a system printed circuit board, may be integrated into an I/O processor component, may be integrated with a processor on a system-on-a-chip (SoC), or may be implemented in another way, as needed or desired. Memory controller 126 operates to provide data and control interfaces to one or more DIMMs, such as DIMMs 104, 106, and 108, in accordance with a particular memory architecture. For example, memory controller 126 and the DIMMs 104, 106, and 108 may operate in accordance with a Double-Data Rate (DDR) standard, such as a JEDEC DDR4 or DDR5 standard.

Typically, before any usable memory 134 within DIMMs 104, 106, and 108 may be accessed by OS 124, BIOS 122 performs a POST for information handling system 100. During the POST, BIOS 122 executes MRC 132 to access information associated with DIMMs 104, 106, and 108 and configure a memory address decode register for DIMMs 104, 106, and 108 as will be described herein. In an embodiment, the information associated with DIMMs 104, 106, and 108 stored within the memory address decode register may include, but is not limited to, a mode of operation for DIMMs 104, 106, and 108, and a total amount of memory for the DIMMs, and the like. The mode of operation can be an application-direct mode, a memory mode, a storage mode, or the like. In the application-direct mode, applications executed by processor core 120 via OS 124 directly access data stored within DIMMs 104, 106, and 108. In the memory mode, a DRAM portion of DIMMs 104, 106, and 108 are accessed by processor core 120 of CPU 102 to store data in the DIMMs. In the storage mode, data is accessed in DIMMs 104, 106, and 108 in a block data format. These modes of operation can be set as attributes for DIMMs 104, 106, and 108 by the OS 124, by UEFI environment of BIOS 122, or the like. After the memory address decode register has been configured for DIMMs 104, 106, and 108 and other operations of POST have been completed, BIOS 122 may exit POST and processor core 120 performs one or more runtime operations of OS 124.

Figure 2:
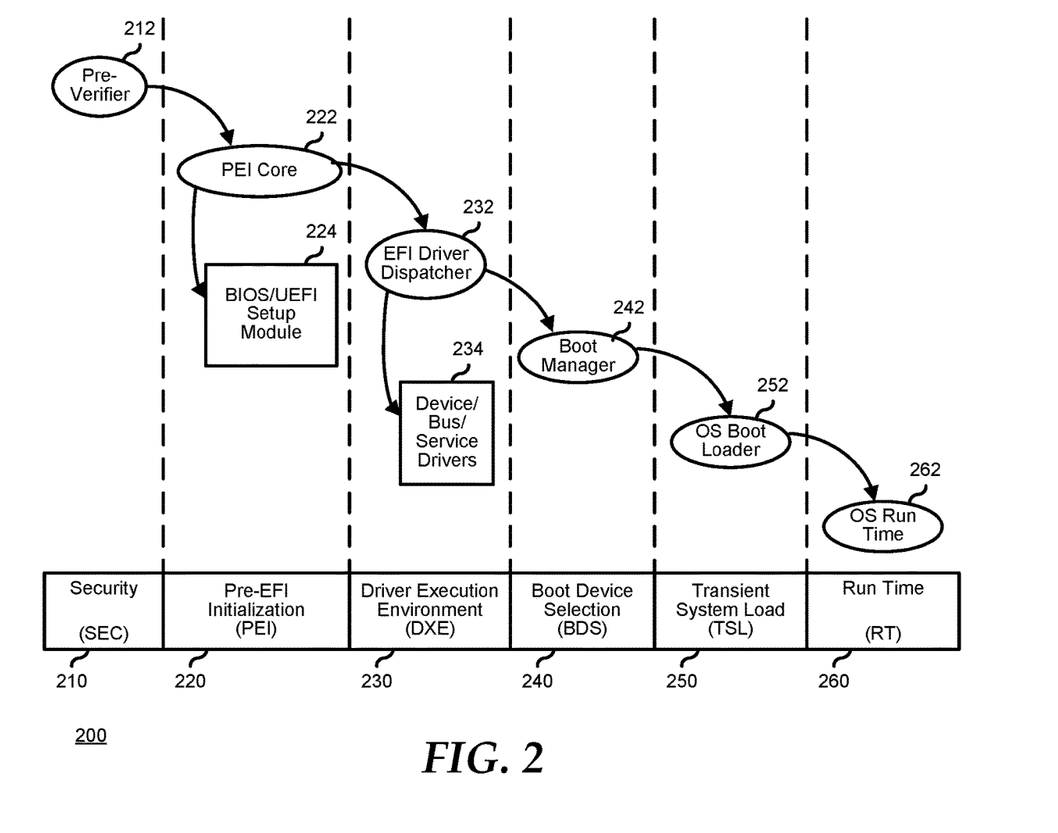
FIG. 2 is a phase diagram for a UEFI boot of the information handling system according to at least one embodiment of the disclosure.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, a run time phase (RT) 260, and an afterlife phase (AL) (not shown). SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 210 is executed out of the firmware resident on the information handling system, such as BIOS 122, and so serves as a root of trust for the system. SEC 210 passes execution to PEI 220 which initializes the system memory for the information handling system. PEI 220 includes CPU initialization 224, chipset initialization (not shown), and board resource initialization (not shown).

PEI 220 passes execution to DXE 230 which performs device specific initializations for the information handling system. In particular, DXE 230 executes an EFI driver dispatcher 232 that operates to load device, bus, and service drivers 234. For example, the EFI driver dispatcher 232 may load drivers including, but not limited to, an address range scrubbing (ARS) driver 332 of FIG. 3, a block input/output (I/O) driver 334 of FIG. 3, and a partition driver 336 of FIG. 3. DXE 230 passes execution to BDS 240 to execute a boot manager 242 which identifies a boot target, and passes execution to TSL 250. TSL 250 launches an OS boot loader 252 which loads the operating system, and passes execution to the operating system 262 at RT 260.

Techniques disclosed herein may typically be implemented during DXE 230, and may utilize services provided by the UEFI specification, such as boot services. UEFI applications, including OS loaders, must use boot services functions to access devices and allocate memory. Services are defined by interface functions that may be used by code running in the UEFI environment. Such code may include protocols that manage device access or extend platform capability, as well as applications running in the pre-boot environment, and OS loaders. During boot, system resources are owned by the firmware and are controlled through boot services interface functions. All boot services functionality is available until an OS loader loads enough of its own environment to take control of the system's continued operation and then terminates boot services with a call to ExitBootServices( ).

One class of boot services includes protocol handler services, such as LoadImage, StartImage, InstallProtocolInterface, RegisterProtocolNotify, LocateProtocol, and numerous others. A protocol consists of a 128-bit globally unique identifier (GUID) and a Protocol Interface structure. The structure contains the functions and instance data that are used to access a device. The functions that make up Protocol Handler Services allow applications to install a protocol on a handle, identify the handles that support a given protocol, determine whether a handle supports a given protocol, and the like. LoadImage loads an image, such as a device driver, into system memory. StartImage transfers control to a loaded image's entry point. InstallProtocolInterface installs a protocol interface on a device handle. A driver can install multiple protocols. RegisterProtocolNotify registers an event that is to be signaled whenever an interface is installed for a specified protocol. LocateProtocol returns an array of handles that support a specified protocol. During DXE 230, boot services and runtime services can be started and a UEFI boot manager can load UEFI drivers and UEFI applications in an order defined by the global NVRAM variables. Driver initialization includes identifying a driver image that is stored on some type of media, such as at NVRAM 330 of FIG. 3. While the techniques disclosed herein are typically implemented during DXE 230, in another embodiment, these techniques can be implemented using UEFI system management services, such as SmmInstallProtocolInterface, SmmRegisterProtocolNotify, and the like.

Figure 3:
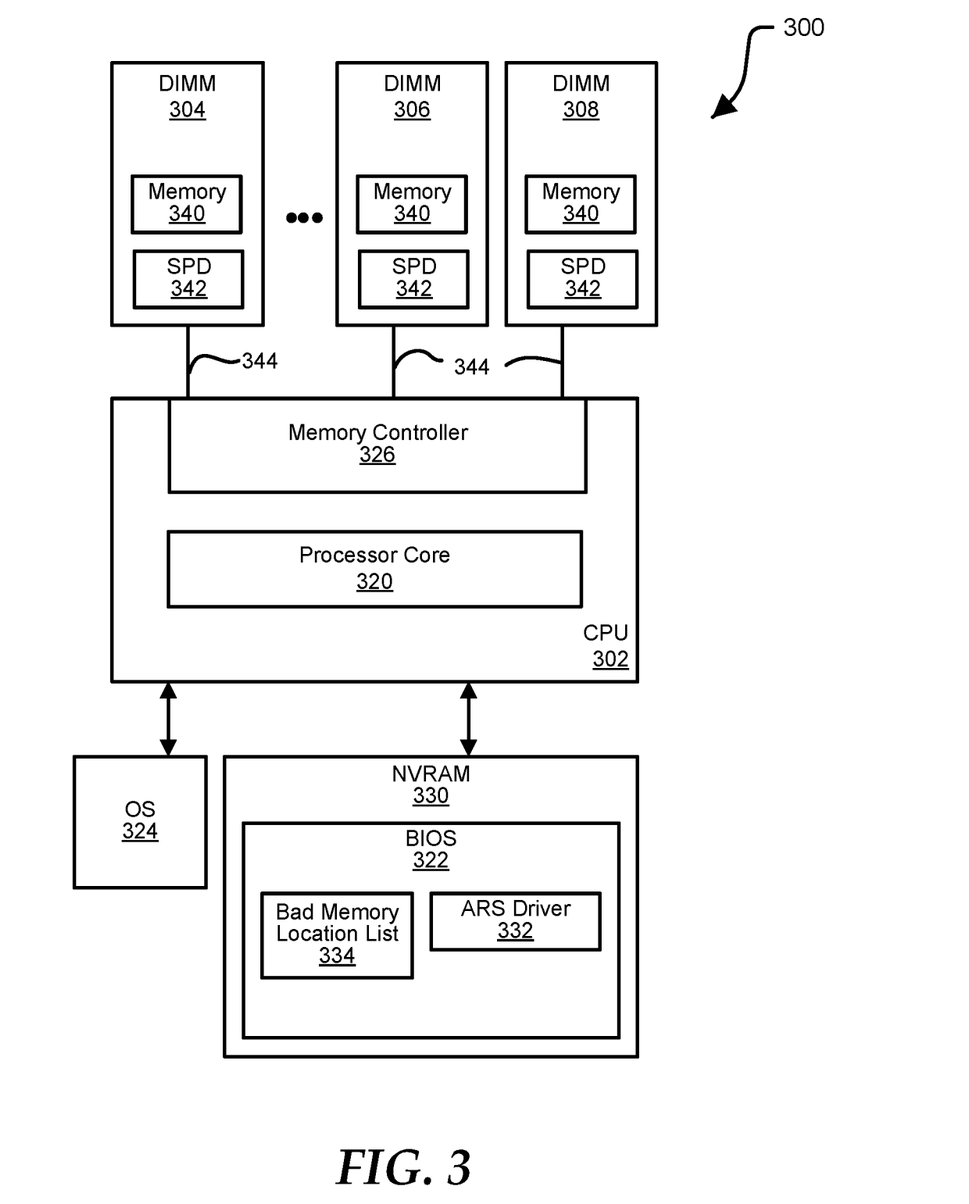
FIG. 3 is a block diagram of another portion of an information handling system according to at least one embodiment of the disclosure.

FIG. 3 illustrates an information handling system 300 similar to information handling system 100 of FIG. 1, including a CPU 302, DIMMs 304, 306, and 308 (DIMMs 304-308), and a non-volatile random access memory (NVRAM) 330. CPU 302 includes a processor core 320 and a memory controller 326. CPU 302 is in communication with NVRAM 330, which stores a BIOS 322. BIOS 322 includes an address range scrub (ARS) driver 332 and a bad memory location list 334. CPU 302 executes BIOS 322, and upon completion of the BIOS 322 executes an OS 324.

Each of DIMMs 304, 306, and 308 includes memory 340 and serial presence detect (SPD) data 342. CPU 302 communicates with each of DIMMs 304, 306, and 308 via one or more communication interfaces 344. In an embodiment, each communication interface 344, shown between CPU 302 and DIMM 304, 306, and 308 represents one or more different communication interfaces. In particular, a first portion of communication interface 344 may represent a high-bandwidth data communication interface for communicating data between CPU 302 and memory 340. For example, the high-bandwidth data communication interface may include an interface that operates in accordance with a Double-Data Rate (DDR) standard, such as a JEDEC DDR4 or DDR5 standard. Further, a second portion of communication interface 344 may represent a low-bandwidth data communication interface for communicating data between CPU 302 and SPD data 342. For example, the low-bandwidth data communication interface may include a System Management Bus (SMBus) interface. During a boot process, such as a POST portion of PEI phase 220 of a UEFI boot process, BIOS 322 operates to access SPD data 342 from each of DIMMs 304, 306, and 308 to configure the operations between CPU 320 and the DIMMs. SPD data 342 includes information as to the configuration, capacity, signal timing requirements, and other parameters for the operation between CPU 320 and DIMMs 302, 304, and 306. After BIOS 322 configures the operations between CPU 320 and DIMMs 302, 304, and 306, the CPU can communicate with memory 340 in the DIMMs directly via the high-bandwidth communication interface.

In a particular embodiment, one or more of DIMMs 302, 304, and 306 represents a NVDIMM such as an Intel Optane DC Persistent Memory Module (DCPMM) DIMM. Here, a portion of memory 340 is reserved for various functions that are related to how the NVDIMM is to be utilized in information handling system 300. For example, BIOS 322 can store information related to the memory mode (e.g., application-direct mode, memory mode, storage mode) in which to operate the NVDIMM, to namespaces instantiated on the NVDIMM, or the like. Here, the information can be stored on different partitions of memory 340 that are restricted from access by the CPU under the control of OS 324. That is, the partitions may represent memory regions of memory 340 that are reserved to the use of BIOS 322.

During a boot process, such as DXE phase 230 of a UEFI boot process, ARS driver 332 performs one or more operations to check memory 340 of each of DIMMs 304-308. During the check, ARS driver 332 determines whether one or more blocks of memory 340 include bad memory locations. For example, if a detected bad memory location cannot be corrected, ARS driver 332 may identify the bad memory location as an uncorrectable (UNC) location and may identify data within the memory location as poisoned data. In response to identifying UNC locations, ARS driver 332 creates a bad memory locations list 334 and stores each identified bad memory location of memory 340 within DIMMs 304-308 in bad memory locations list 334. ARS driver 332 also publishes an ARS bad list protocol to enable other drivers of the UEFI boot process to utilize bad memory location list 334.

In a particular embodiment, BIOS 322 performs one or more operations to boot OS 324 of information handling system 300. Here, during the boot process, an entry point for a block I/O driver is run, during which, the block I/O driver calls the ARS bad list protocol and retrieves bad memory location list 334. A partition driver may call the block I/O driver to check whether a persistent memory device, such as DIMM 304, has a bootable image within memory 340. For example, a partition driver may check memory 340 of DIMM 304 by calling a block I/O driver to access one or more blocks within a memory region of memory 340. For example, the access of the one or more blocks may be a request to read from, write to, or flush the one or more blocks within memory 340 of DIMM 304.

When determining whether memory 340 of DIMM 304 includes a bootable image, partition driver 336 may not have access to bad memory location list 334 created by ARS driver 332, and may always request to access the first few blocks within a memory region of memory 340. In previous information handling systems, if a bad memory location within requested blocks is accessed, the poisoned data within the bad memory location may be consumed, which in turn may cause a machine check error within information handling system 300. In an example, the machine check error may cause the previous information handling system to be hung in the boot process.

Figure 4:
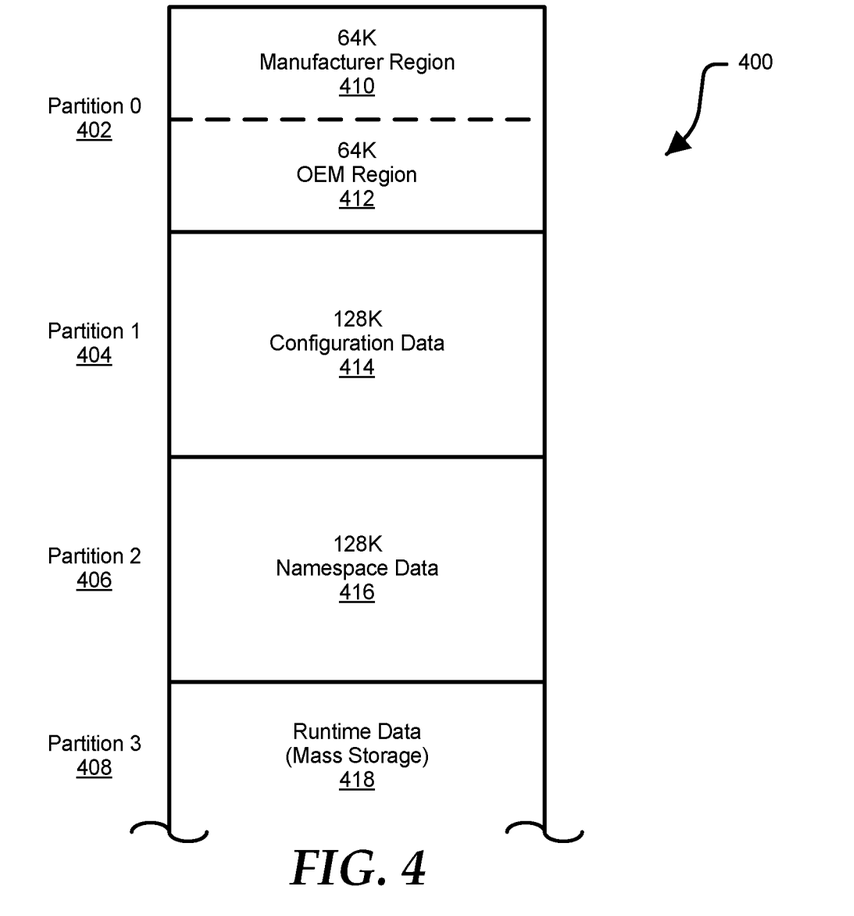
FIG. 4 is a memory map illustrating a memory partition of an NVDIMM according to at least one embodiment of the disclosure.

FIG. 4 illustrates a partition map 400 of a NVDIMM, such as an Intel Optane DC Persistent Memory Module (DCPMM) DIMM. Partition map 400 includes partitions 402, 404, 406, and 408. Partition 402 is a 128 kilobyte (KB) partition that includes a 64 KB region 410 that is reserved for information stored by a manufacturer of the NVDIMM, for example, for Intel proprietary information related to the configuration of the NVDIMM. Partition 402 also includes a 64 KB region 412 that is accessible to an original equipment manufacturer (OEM) for storage of information that is at the OEMs discretion. Various embodiments information to be stored in OEM region 412 will be described further below. Partition 404 is a 128 KB partition that includes a configuration data segment 414. Partition 406 is a 128 KB partition that includes namespace data for one or more NVDIMMs that are configured in the storage mode. Partition 408 represents the bulk of the data storage capacity of the DIMM that is usable in the selected mode by the information handling system for data storage.

Figure 5:
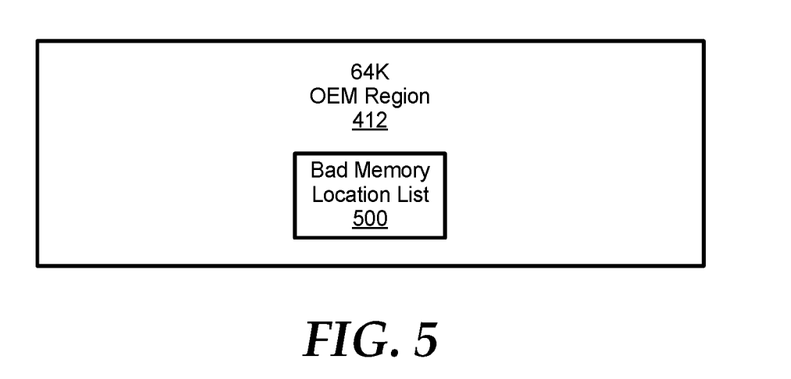
FIG. 5 illustrates an OEM region of the memory map of FIG. 4.

Returning to FIG. 3, during a boot process and during runtime, uncorrectable errors detected in DIMMs 304, 306, and 308 are reported by hardware, and a system management interrupt (SMI) is generated to direct BIOS 322 to log the uncorrectable errors. In addition to logging the uncorrectable errors, BIOS 322 reports the failing System Physical Address (SPA) to OS 324 through an ARS driver 332 which publishes bad memory list 334. For example, ARS driver 332 may implement an Advanced Configuration and Power Interface (ACPI) NVDIMM Device Specific Method (DSM) function, as needed or desired. In a particular embodiment, BIOS 332 also saves the failing SPA to NVRAM 330. However, because the SPA of any particular bad memory location is based upon the memory configuration of information handling system 300, bad memory location list 334 becomes invalid if the memory mode of DIMMs 304, 306, and 308 are change, when new DIMMs are moved into information handling system 300, or when the memory configuration is otherwise changed. In such cases, BIOS 332 needs to perform a complete ARS process to establish the new SPAs of the uncorrectable errors to populate bad memory location list 334. As the size of memory 340 increases with newer generation NVDIMMs, such as where an DCPMM has a memory of 128 GB, the time to run the complete ARS may exceed 90 seconds to scrub a full DIMM. Here, with a memory configuration that includes 24×512 GB DCPMMs, running a complete ARS may exceed 35 minutes, within which time an OS boot loader will not start Persistent Memory operations In a particular embodiment, when, during the boot process or during runtime, a bad memory location is identified and ARS driver 332 stores the SPA of the identified bad memory location in bad memory locations list 334, the ARS driver writes the bad memory location to the OEM region of the effected DIMM. FIG. 5 illustrates OEM region 412 with a copy of bad memory locations list 500. Here, in a first case, the bad memory location is stored to bad memory location list 500 as the SPA of the bad memory location within the memory architecture of the information handling system. However, in this case, the problem identified above related to changes to the memory architecture, as described above. Further, any changes to the memory architecture will necessitate rewriting the locations of the bad memory within bad memory locations list 500. Thus, in this case, the duration of time needed to perform the complete ARS becomes even longer due to the necessity to write the bad memory locations to OEM region 412.

In a second case, instead of writing the SPA of the bad memory locations to OEM region 412, ARS driver 332 stores the SPA of the identified bad memory location in bad memory locations list 334. ARS driver 332 is one of the drivers that can write bad memory location in the bad memory locations list, but it is not necessarily the only driver that can write to bad memory locations list. For example, a memory controller, DCPMM firmware, or another agent can find bad memory locations. and can write the bad memory locations to bad memory locations list 334. In such cases, a BIOS memory error handler driver can be invoked to write the bad memory locations to bad memory locations list 334. ARS driver 332 further determines which one of DIMMs 304, 306, and 308 is experiencing the bad memory locations, determines the DIMM Physical Address (DPA) of the bad memory locations within each DIMM, and writes the bad memory location to bad memory location list 500 as the DPA of the bad memory location within the particular DIMM. In this case, when BIOS 322 detects that the memory architecture has changed, the BIOS directs ARS driver 332 to read the DPAs of the bad memory location lists 500 from each of DIMMs 304, 306, and 308, converts the DPAs to associated SPAs, and repopulates bad memory locations list 334 on NVRAM 320. In this way, the time needed to perform a complete ARS process is eliminated. Further, when a DIMM that incudes a bad memory location list that is stored with the DPAs of the bad memory locations on that particular DIMM is migrated to a different information handling system, the information related to its own bad memory locations is transported with that DIMM, and ARS driver 332 will not need to run a complete ARS process in order to correctly populate the bad memory locations list of the new information handling system.

Figure 6:
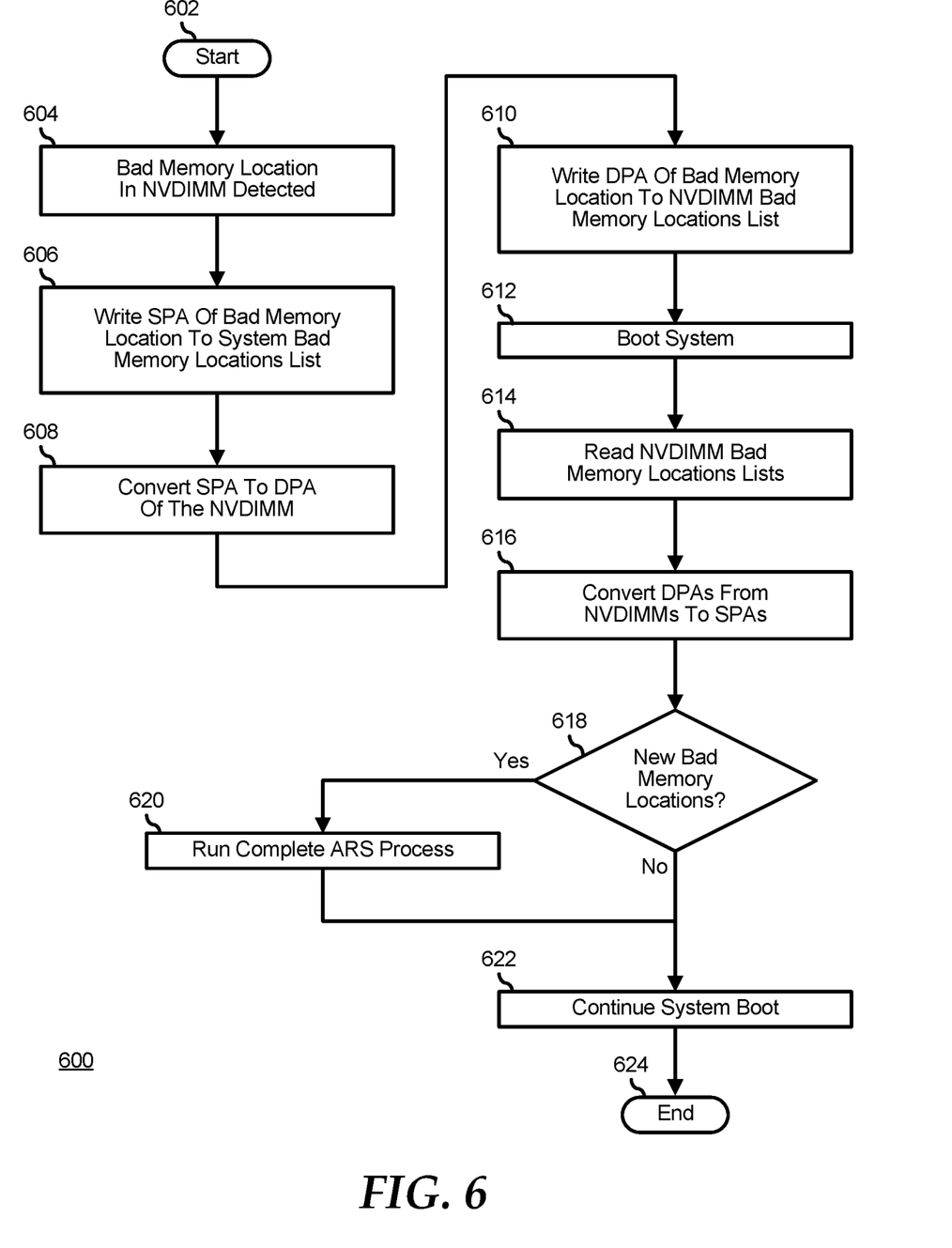
FIG. 6 is a flow diagram illustrating a method to reduce address range scrub execution time in NVDIMMs according to at least one embodiment of the disclosure.

FIG. 6 is a flow diagram illustrating a method 600 to reduce ARS execution time in NVDIMMs, such as in Intel Optane DCPMMs, starting at block 602. It will be readily appreciated that not every method step set forth in this flow diagram is always necessary, and that certain steps of the methods can be combined, performed simultaneously, in a different order, or perhaps omitted, without varying from the scope of the disclosure. At block 604, a bad memory location is detected in a NVDIMM. An ARS driver writes the SPA of the bad memory location to a system bad memory locations list in block 606, and the ARS driver converts the SPA of the bad memory location to a DPA for the particular NVDIMM in block 608. At block 610, the ARS driver writes the DPA of the bad memory location to the bad memory locations list of the NVDIMM.

The information handling system is booted at block 612, and the bad memory locations lists from the NVDIMMs are read by the ARS driver in block 614. The ARS driver converts the DPAs of the bad memory locations from the NVDIMM bad memory locations lists in block 616. A decision is made as to whether any new bad memory locations are described by the SPAs identified from the NVDIMM bad memory locations lists in decision block 618. That is, whether or not the SPAs identified from the NVDIMM bad memory lists match the SPAs in the system bad memory list in decision block 618. Here, the method determines if any NVDIMMs have been newly installed into the information handling system. If no new bad memory locations are described by the SPAs identified from the NVDIMM bad memory locations lists, the "NO" branch of decision block 618 is taken, the system boot process is continued in block 622, and the method ends in block 624. If new bad memory locations are described by the SPAs identified from the NVDIMM bad memory locations lists, the "YES" branch of decision block 618 is taken, a complete ARS process is performed in block 620, the system boot process is continued in block 622, and the method ends in block 624.

Figure 7:
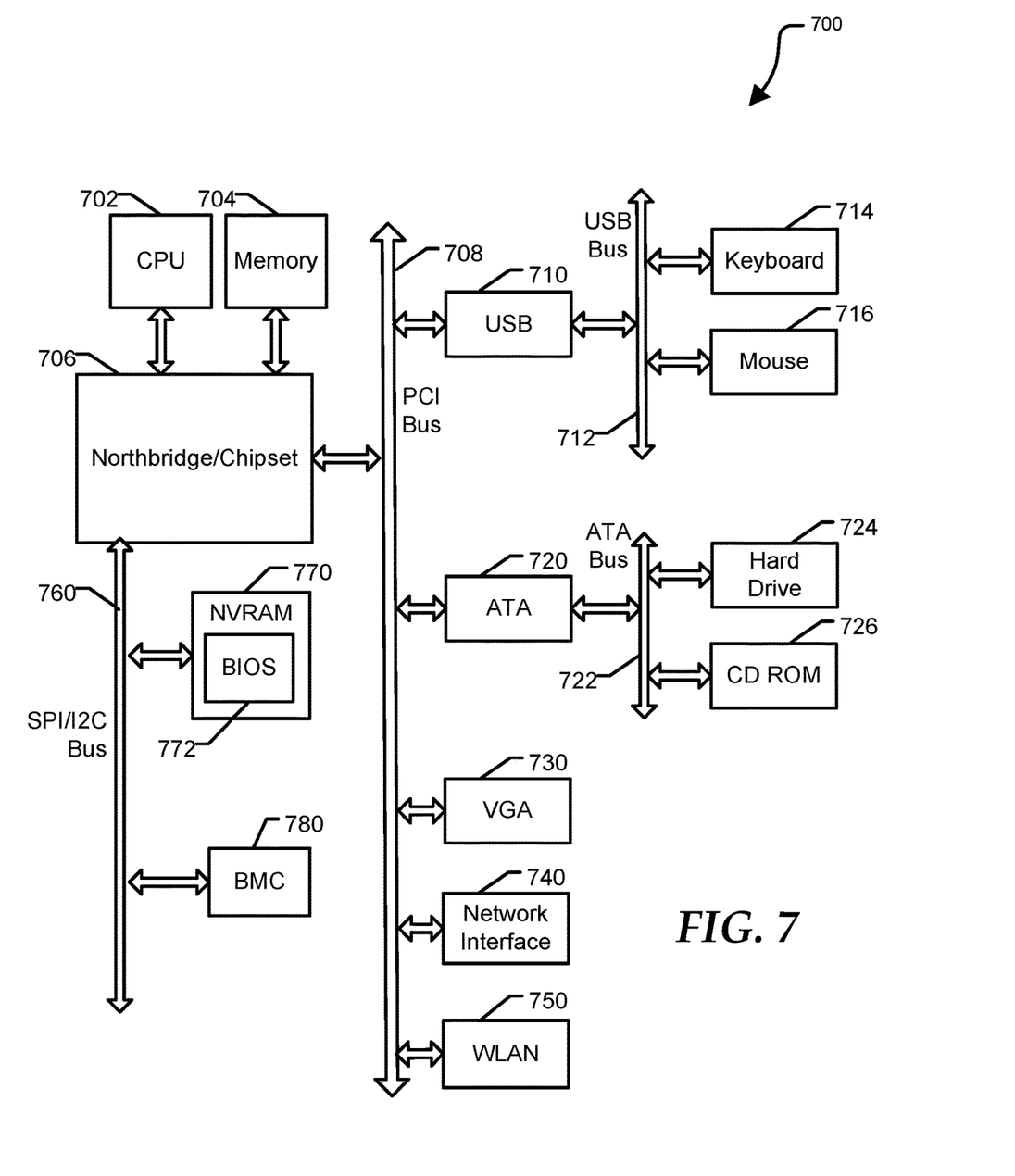
FIG. 7 is a block diagram of a general information handling system according to at least one embodiment of the disclosure.

FIG. 7 illustrates a general information handling system 700 including a processor 702, a memory 704, a northbridge/chipset 706, a PCI bus 708, a universal serial bus (USB) controller 710, a USB 712, a keyboard device controller 714, a mouse device controller 716, a configuration an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a NVRAM 770 for storing BIOS 772, and a baseboard management controller (BMC) 780. In an embodiment, information handling system 700 may be information handling system 100 of FIG. 1 and/or information handling system 300 of FIG. 3. BMC 780 can be referred to as a service processor or embedded controller (EC). Capabilities and functions provided by BMC 780 can vary considerably based on the type of information handling system. For example, the term baseboard management system is often used to describe an embedded processor included at a server, while an embedded controller is more likely to be found in a consumer-level device. As disclosed herein, BMC 780 represents a processing device different from CPU 702, which provides various management functions for information handling system 700. For example, an embedded controller may be responsible for power management, cooling management, and the like. An embedded controller included at a data storage system can be referred to as a storage enclosure processor.

For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as CPU 702, a programmable logic array (PLA), an embedded device such as a System-on-a-Chip (SoC), or other control logic hardware. Information handling system 700 can also include one or more computer-readable medium for storing machine-executable code, such as software or data.

System 700 can include additional processors that are configured to provide localized or specific control functions, such as a battery management controller. Bus 760 can include one or more busses, including a SPI bus, an I2C bus, a system management bus (SMBUS), a power management bus (PMBUS), and the like. BMC 780 can be configured to provide out-of-band access to devices at information handling system 700. As used herein, out-of-band access herein refers to operations performed prior to execution of BIOS 772 by processor 702 to initialize operation of system 700.

BIOS 772 can be referred to as a firmware image, and the term BIOS is herein used interchangeably with the term firmware image, or simply firmware. BIOS 772 includes instructions executable by CPU 702 to initialize and test the hardware components of system 700, and to load a boot loader or an operating system (OS) from a mass storage device. BIOS 772 additionally provides an abstraction layer for the hardware, such as a consistent way for application programs and operating systems to interact with the keyboard, display, and other input/output devices. When power is first applied to information handling system 700, the system begins a sequence of initialization procedures. During the initialization sequence, also referred to as a boot sequence, components of system 700 are configured and enabled for operation, and device drivers can be installed. Device drivers provide an interface through which other components of the system 700 can communicate with a corresponding device.

Information handling system 700 can include additional components and additional busses, not shown for clarity. For example, system 700 can include multiple processor cores, audio devices, and the like. While a particular arrangement of bus technologies and interconnections is illustrated for the purpose of example, one of skill will appreciate that the techniques disclosed herein are applicable to other system architectures. System 700 can include multiple CPUs and redundant bus controllers. One or more components can be integrated together. For example, portions of northbridge/chipset 706 can be integrated within CPU 702. Additional components of information handling system 700 can include one or more storage devices that can store machine-executable code, one or more communications ports for communicating with external devices, and various input and output (I/O) devices, such as a keyboard, a mouse, and a video display. For example, device controller 730 may provide data to a display device 790 to visually present the information to an individual associated with information handling system 700. An example of information handling system 700 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 700 can include a set of instructions that can be executed to cause the information handling system to perform any one or more of the methods or computer based functions disclosed herein. The information handling system 700 may operate as a standalone device or may be connected to other computer systems or peripheral devices, such as by a network.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The information handling system 700 can include a disk drive unit and may include a computer-readable medium, not shown in FIG. 7, in which one or more sets of instructions, such as software, can be embedded. Further, the instructions may embody one or more of the methods or logic as described herein. In a particular embodiment, the instructions may reside completely, or at least partially, within system memory 704 or another memory included at system 700, and/or within the processor 702 during execution by the information handling system 700. The system memory 704 and the processor 702 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A non-volatile dual in-line memory module (NVDIMM), comprising:
    a first partition of non-volatile memory; and
    a second partition of non-volatile memory;
    wherein the first partition is a reserved partition that is not accessible to an operating system instantiated on an information handling system into which the NVDIMM is installed, and the second partition is accessible to the operating system, and wherein the NVDIMM receives a first DIMM physical address (DPA) associated with a first bad memory location within the second partition, and stores the DPA to a NVDIMM bad memory locations list in the first partition.

2. The NVDIMM of claim 1, wherein the first partition includes a first region reserved for a manufacturer of the NVDIMM, and a second region reserved for a manufacturer of the information handling system.

3. The NVDIMM of claim 2, wherein the NVDIMM bad memory locations list is in the second region of the first partition.

4. The NVDIMM of claim 1, further comprising:
    a third partition of non-volatile memory, wherein the third partition includes configuration data for the NVDIMM.

5. The NVDIMM of claim 4, further comprising:
a fourth partition of non-volatile memory, wherein the fourth partition includes namespace data for the NVDIMM.

6. The NVDIMM of claim 1, wherein the NVDIMM is configured to provide the NVDIMM bad memory locations list to an address range scrub (ARS) process of the information handling system.

7. The NVDIMM of claim 1, further comprising:
a high-bandwidth data communication interface; and
a low-bandwidth data communication interface.

8. The NVDIMM of claim 7, wherein the high-bandwidth data communication interface is a Double-Data Rate-5 (DDR5) data communication interface.

9. The NVDIMM of claim 7, further comprising:
serial presence detect (SPD) data.

10. The NVDIMM of claim 9, wherein the low-bandwidth data communication interface is a System Management Bus (SMBus) interface, and wherein the SPD data is accessed via the SMBus.

11. A method, comprising:
providing, on a non-volatile dual in-line memory module (NVDIMM), a first partition of non-volatile memory; and
restricting access to the first partition from an operating system instantiated on an information handling system into which the NVDIMM is installed;
providing, on the NVDIMM, a second partition of non-volatile memory;
permitting access to the second partition to the operating system;
receiving a first DIMM physical address (DPA) associated with a first bad memory location within the second partition; and
storing the DPA to an NVDIMM bad memory locations list in the first partition.

12. The method of claim 11, wherein the first partition includes a first region reserved for a manufacturer of the NVDIMM, and a second region reserved for a manufacturer of the information handling system.

13. The method of claim 12, wherein the NVDIMM bad memory locations list is in the second region of the first partition.

14. The method of claim 11, further comprising providing, on the NVDIMM, a third partition of non-volatile memory, wherein the third partition includes configuration data for the NVDIMM.

15. The method of claim 14, further comprising providing, on the NVDIMM, a fourth partition of non-volatile memory, wherein the fourth partition includes namespace data for the NVDIMM.

16. The method of claim 11, further comprising providing the NVDIMM bad memory locations list to an address range scrub process of the information handling system.

17. The method of claim 11, further comprising:
providing, on the NVDIMM, a high-bandwidth data communication interface; and
providing, on the NVDIMM, a low-bandwidth data communication interface.

18. The method of claim 17, wherein the high-bandwidth data communication interface is a double-data rate-5 data communication interface.

19. The method of claim 17, further comprising providing, on the NVDIMM, serial presence detect data, wherein the low-bandwidth data communication interface is a system management bus interface, and wherein the serial presence detect data is accessed via the system management bus.

20. A non-volatile dual in-line memory module (NVDIMM), comprising:
a first partition of non-volatile memory;
a second partition of the non-volatile memory;
a third partition of the non-volatile memory; and
a fourth partition of the non-volatile memory;
wherein the first partition is a reserved partition that is not accessible to an operating system instantiated on an information handling system into which the NVDIMM is installed, the second partition is accessible to the operating system, the third partition includes configuration data for the NVDIMM, and the fourth partition includes namespace data for the NVDIMM, wherein the NVDIMM receives a first DIMM physical address (DPA) associated with a first bad memory location within the second partition, and stores the DPA to a NVDIMM bad memory locations list in the first partition, wherein the first partition includes a first region reserved for a manufacturer of the NVDIMM, and a second region reserved for a manufacturer of the information handling system, and wherein the NVDIMM bad memory locations list is in the second region of the first partition.

* * * * *